Nov. 10, 1964 A. M. IOAKIMIDIS ET AL 3,156,775

TELEPHONE CONVERTER

Filed Dec. 2, 1959 5 Sheets-Sheet 1

Nov. 10, 1964 A. M. IOAKIMIDIS ETAL 3,156,775

TELEPHONE CONVERTER

Filed Dec. 2, 1959 5 Sheets-Sheet 4

United States Patent Office 3,156,775
Patented Nov. 10, 1964

3,156,775
TELEPHONE CONVERTER

Anthony M. Ioakimidis, Chicago, and Donald E. Hutson, La Grange, Ill., assignors to International Telephone and Telegraph Corporation, New York, N.Y., a corporation of Maryland Filed Dec. 2, 1959, Ser. No. 856,776
20 Claims. (Cl. 179—16)

This invention relates to telephone converters and more particularly to converters for interconnecting conventional and electronic switching telephone systems.

In addition to providing for transmission of voice signals, typical telephone systems must also provide for transmission of certain supervisory signals. For example, it is necessary to send seizure signals, ringing signals, release signals, acknowledgement signals, etc. In electromechanical and manual systems of conventional design, the most common forms of supervisory signalling have been by means of either common battery or ringdown operations. In a common battery system, certain signals are transmitted by opening or closing loops which provide direct current paths—as when a hookswitch is operated by a subscriber, for example. In a ring-down or magneto system certain signals are transmitted by means of ringing current, e.g. a first burst of 20 cycle ringing current is a seizure signal and a second burst is a release signal. In newly developed electronic switching systems one or more tones are transmitted to provide the same or similar supervisory functions. When the newly developed systems are installed, it will be necessary to provide adapters or converters which are connected to receive signals from one type of equipment, to convert such received signals to other signals which may be used by another type of equipment, and to transmit such converted signals to such other equipment.

An object of this invention is to provide new and improved telephone signal converters.

Another object of this invention is to provide for converting conventional signals to control electronic switching telephone systems.

Still another object of this invention is to provide means for interconnecting electronic switching telephone systems and conventional telephone equipment.

In accordance with this invention, circuitry responds to the amplitude difference between voice and signalling currents emanating from conventional equipment to cause transmission of tone signals to electronic equipment. Conversely, tone detectors separate signalling current emanating from electronic equipment according to the frequency thereof and cause the transmission of either loop signals or ring-down signals to conventional equipment. Moreover, timing circuits are built into the converter equipment to cause an automatic release of all associated equipment if voice signals do not appear on or are removed from talking conductors for a predetermined period of time.

The above mentioned and other objects of this invention together with the manner of obtaining them will become more apparent and the invention itself will be best understood by making reference to the following description of two embodiments of the invention taken in conjunction with the accompanying drawings in which.

Figure 3:
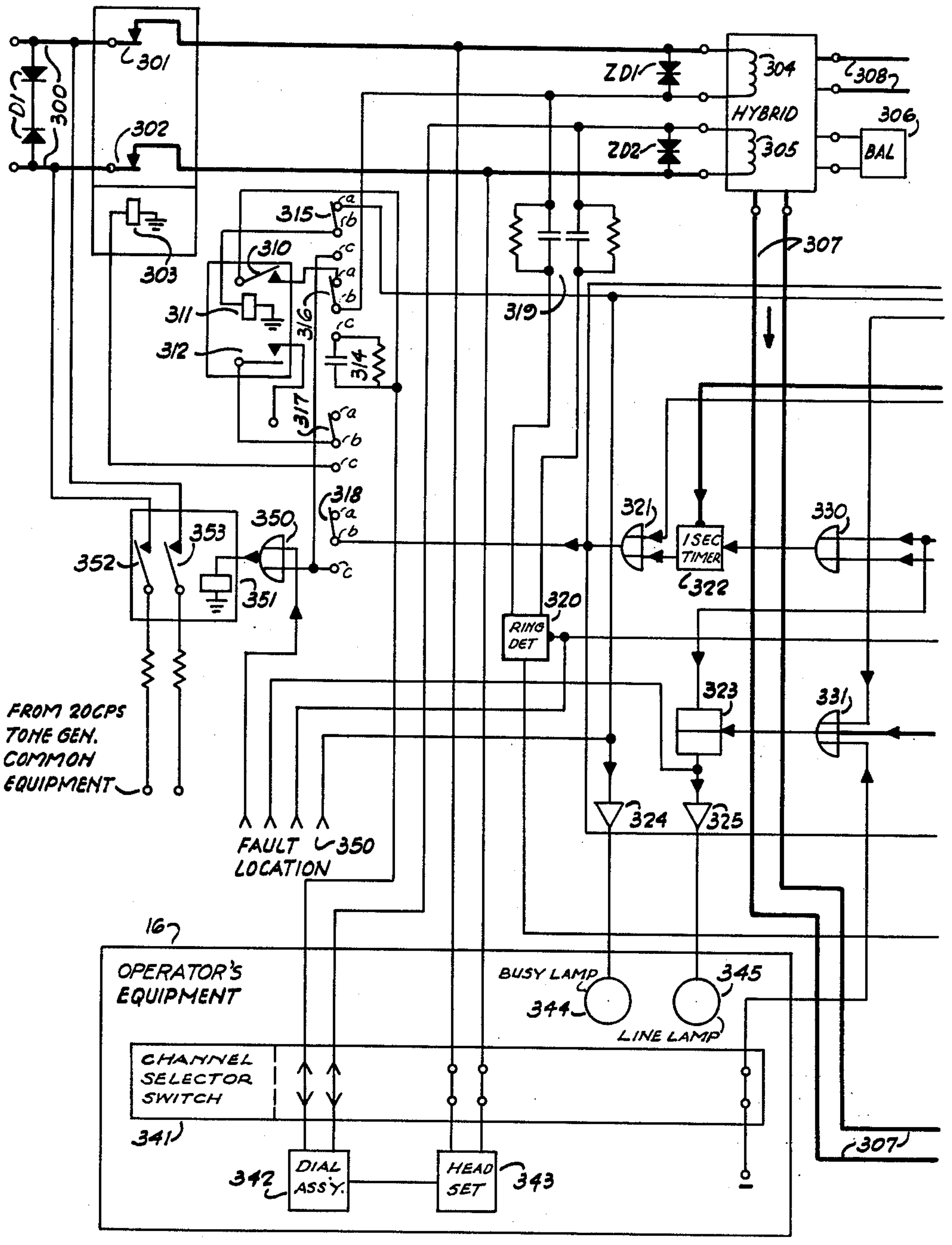
FIGS. 3–5 (when properly joined) show by logic symbols the details of a telephone converter channel of the type shown generally in FIG. 2.
Figure 4:
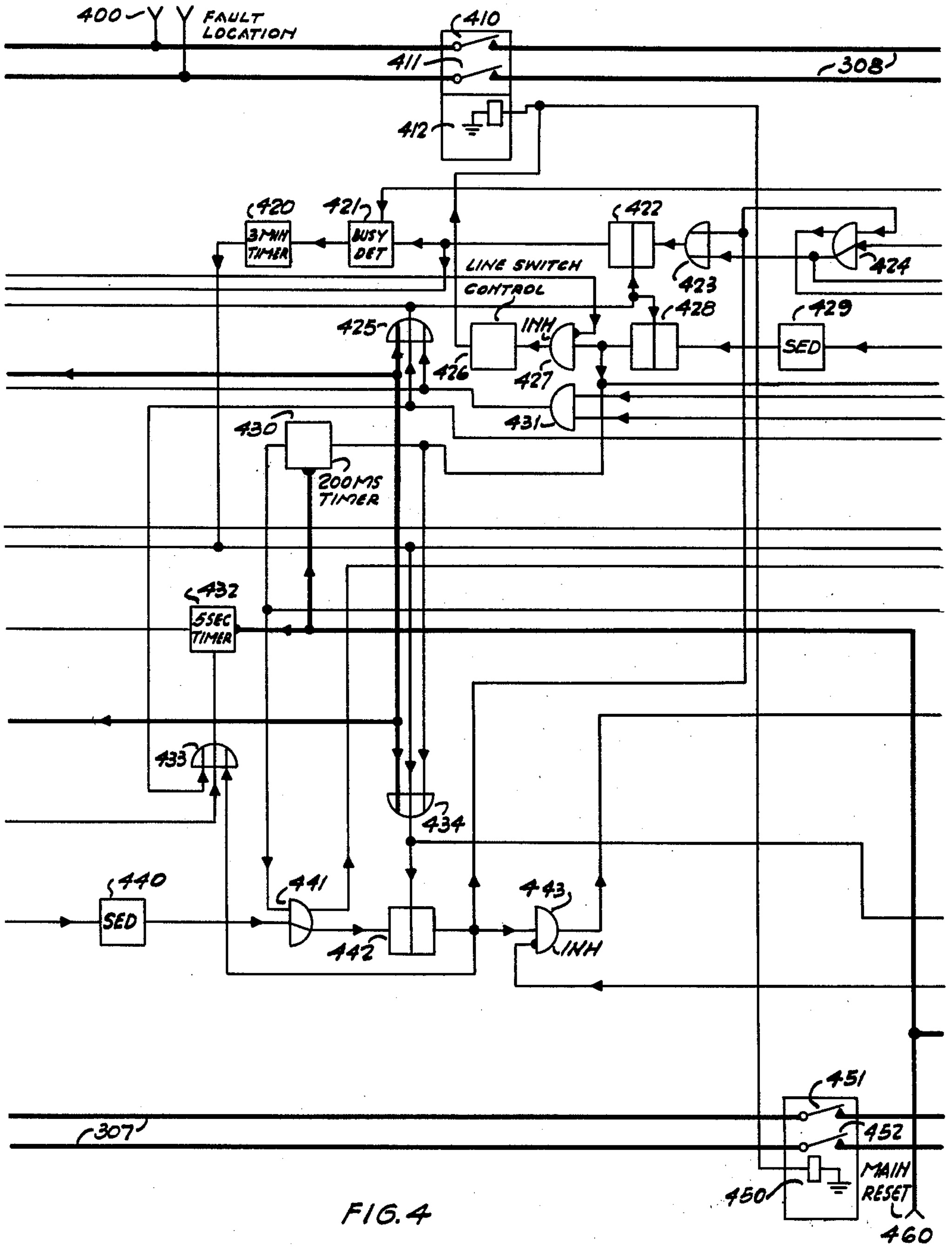
Figure 5:
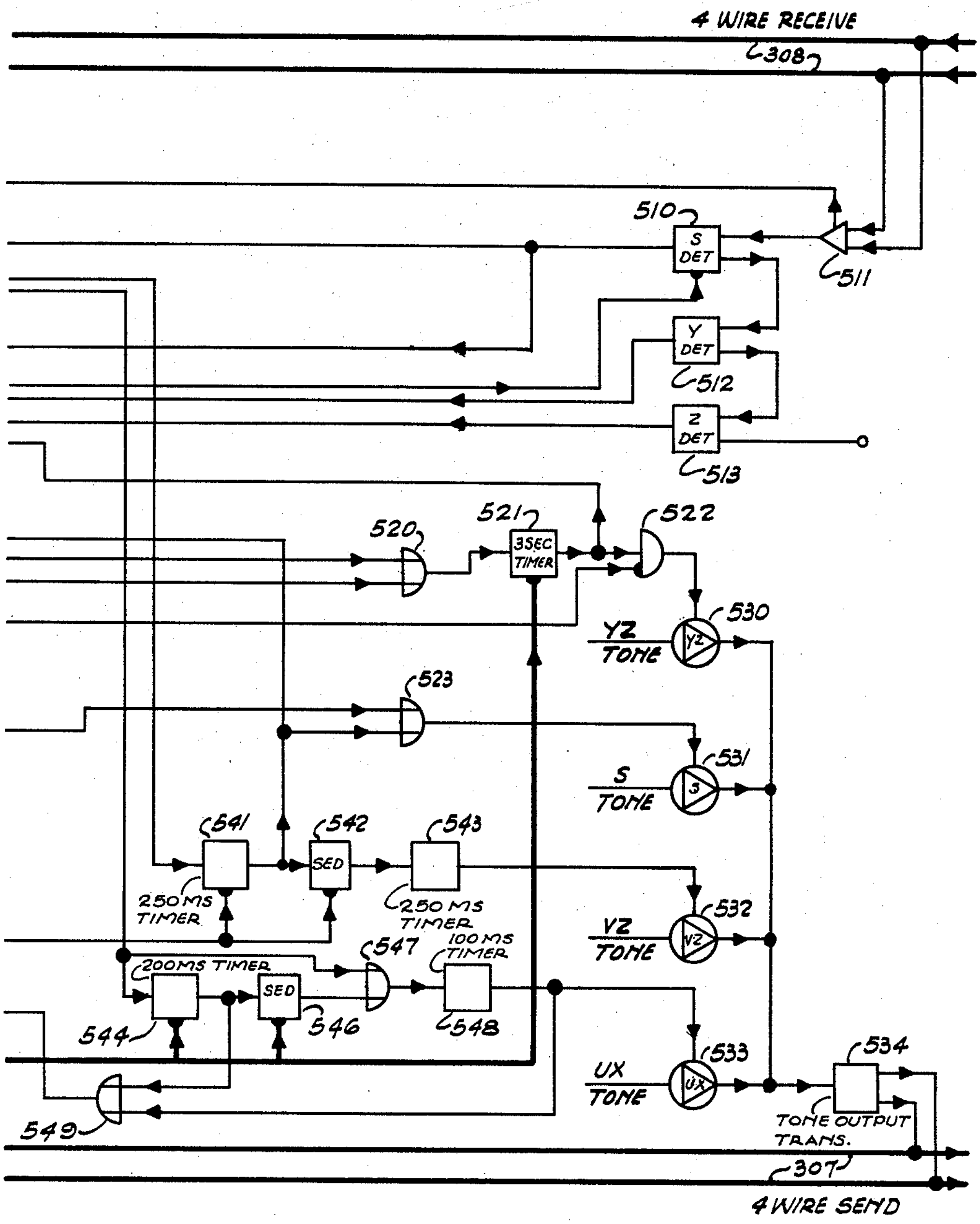

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of Patent Law. For example, FIG. 2 shows the converter as being used in connection with common battery central office equipment ring-down trunks, and manual 2-wire switchboards with carrier; whereas, the principles of the invention may be used any time that it is necessary to convert between various forms of signalling current. Moreover, the circuits of FIGS. 3–5 shows electronic logic equipment; whereas, electromechanical equipment may be used also. Quite obviously, other examples could be selected to illustrate the manner in which the terms that have been used and the items which have been described are entitled to a wide range of equivalents.

*Description of Components*

Figure 1:
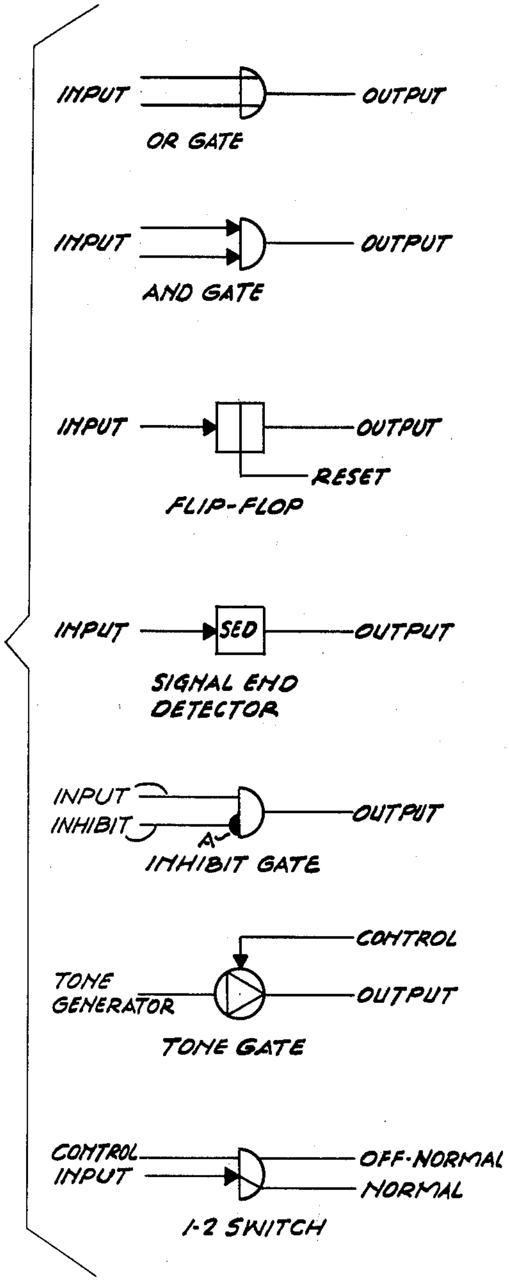
FIG. 1 shows the logic circuit symbols which are used elsewhere in the detailed drawings.
Figure 6:
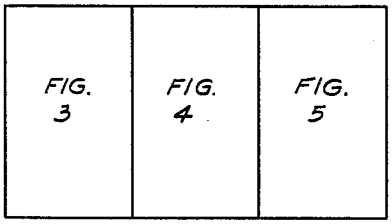
FIG. 6 shows the manner in which FIGS. 3–5 should be joined to provide a complete and understandable circuit.

Referring first to FIG. 1, an "OR" gate (shown as a semi-circle having input conductors intersecting the chord) conducts when any one or more of the input conductors are marked.

An "AND" gate is shown by a semi-circle having input conductors (marked by an arrowhead) touching the chord thereof. An "AND" gate conducts if and only if all of its input terminals are energized simultaneously.

A "flip-flop" is shown by a square having a central bisecting line. When the input conductor (marked by an arrowhead) is energized, the flip-flop turns-on to provide a signal on the output conductor. When the reset terminal (the line bisecting the square) is marked, the flip-flop turns-off and all signals are removed from the output conductor.

A "Signal End Detector" is shown by a square having the letters "SED" enclosed therein. A signal end detector releases a pulse on the output conductor at the end of a signal applied to the input terminal (marked by an arrowhead).

An "Inhibit Gate" is a device which applies signals to an output terminal when an input terminal is marked unless an inhibit terminal is also marked unless an inhibit terminal is also marked. When an inhibit terminal is marked, no signals are transmitted through an inhibit despite the application of a signal at an input terminal. The inhibit terminal is shown by a heavily inked dot such as that marked by the letter "A" in FIG. 1. The heavily inked inhibit indicating dot may also be used in conjunction with other logic symbols.

A "Tone Gate" is shown by a triangle included within a circle. When the control conductor (marked by an arrowhead) is marked any tone applied on a tone generator lead is conducted to an output terminal. When the control terminal is not marked, no tone is transmitted through the tone gate.

A "1–2 Switch" is shown by a semi-circle having an input conductor (marked by an arrowhead). When signals are applied to the input conductor, corresponding signals are applied to a normal output terminal. On the other hand, when signals are applied simultaneously to an input terminal and a control terminal, corresponding signals appear at an off-normal output terminal. For examples of the details of typical 1–2 switches see the following co-pending applications which are assigned to the assignee of the subject invention:

T. A. Pickering, "Electronic Gate Circuit," Serial No. 816,869, filed May 29, 1959; and A. M. Ioakimidis, "Electronic Gate Circuit," issued May 30, 1961 as U.S. Patent No. 2,986,659.

Turning next to a few of the components which are shown in FIGS. 3–5, item 511 is an amplifier which provides an output signal having constant signal strength despite fluctuations of input signal strength. The output signal from amplifier 511 is split into two parts one of which is fed into busy detector 421 and the other of which is fed into tone detector circuits 510, 512 and 513. The details of tone detectors 510, 512 and 513 are set forth in a co-pending application entitled "Tone Detector" filed by Harri Ligotky, Serial No. 842,136, filed September 24, 1959, and assigned to the assignee of the subject invention. As explained by Ligotky, signals are transmitted as complex tones having one or more frequencies; i.e. a seizure signal has "S" frequency, and acknowledge signal may have letter "S" or "V" and "Z" frequencies, a reply signal has "U" and "X" frequencies, and a release signal has "Y" and "Z" frequencies. Quite obviously, any suitable frequencies may be used.

Test means may be connected to monitor the equipment of FIGS. 3–5 continuously. While such test equipment is not shown, it connects to the various jacks marked "FAULT LOCATION." If all required circuit functions do not occur in correct sequence and within fixed time limits, an alarm is given.

A master release circuit is shown by heavily inked conductors. An application of proper signals at point 460 resets all equipment.

Operator's control equipment 16 provides a portable operator control feature which allows local supervision of the equipment. When channel selector switch 341 is connected to a channel in the converter, (FIGS. 3–5) the operator may converse with either subscriber via headset 343 and may control switches via dial assembly 342. The operator is given supervision over trunk conditions by means of lamps 344 and 345.

Item 314, is a resistor-capacitor network designed to have high impedance to ringing current, to substantially block direct current flow, and to provide low impedance to audio currents which occur during telephone conversation. Network 314 interconnects windings 304 and 305 when switch 316 interconnects terminals *b* and *c*, the circuit being traced from the tip side of line 300 through contacts 301, windings 304, switch 316, terminal *c*, network 314, dial assembly 342, coil 305, contacts 302, and the ring side of line 300. Circuit 314 is used primarily to prevent the transfer of ringing current across hybrid networks 304 and 305 to the 4-wire circuit including conductors 307 and 308.

Hybrid windings 304 and 305 are primarily designed as a means for transmitting or otherwise utilizing voice currents; therefore, means is provided for protecting the hybrid windings against peak voltage in the ringing current; i.e. zener diodes ZD1 and ZD2 break down and short windings 304 and 305 when the input signals exceed 5 volts. Means, in the form of diodes D1, are provided to limit the total strength of all signals applied to the converter of FIGS. 3–5. That is, when ringing voltage exceeds 150 volts peak to peak, diodes D1 begin to conduct, thereby limiting the input voltage to the converter to 150 volts peak to peak value. While the values "5 volts" and "150 volts" have been cited above, it should be understood that this citation is merely for the purposes of description and does not in any manner imply that either these or any other specific values are required by the converter.

Item 319 is for coupling the ring current to the ring detector 320. This is actually only a coupling network which shows a lower impedance to voice frequency; however, the bridge network exhibits a fairly high impedance and very little voice current passes through that network since it is shunted by network 314.

*Brief Description*

Figure 2A:
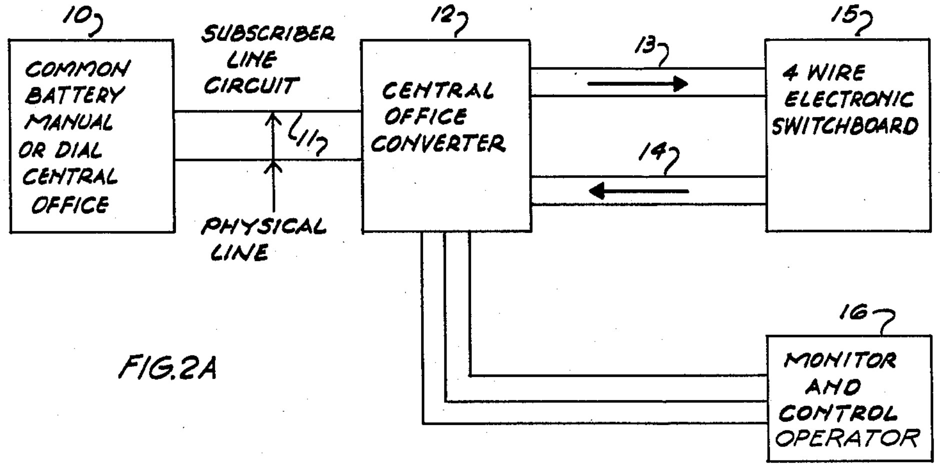
FIGS. 2A, 2B and 2C show by block diagram typical arrangements by which the converter may interconnect 2-wire and 4-wire equipment.

FIG. 2 is a block diagram showing the principles of a system wherein a plurality of exchanges having dissimilar signalling systems may be interconnected via a telephone converter. More specifically, referring to FIG. 2A, a 2-wire battery central office of conventional design which may be either manual or dial, is shown as item 10. Line 11 which extends from 2-wire common battery central office 10 to converter 12 has the same appearance in the common battery office as any subscriber line has. On-hook and off-hook signalling is provided by opening and closing a direct current loop. When line 11 is seized, connector or other equipment signals by transmitting ordinary ringing current as when any subscriber line is signalled. Converter 12 responds to the amplitude difference between ordinary voice current signals and ringing current signals. Responsive thereto, converter 12 transmits tone signals which operate 4-wire, electronic multi-frequency signalling switching equipment 15, transmission being via a send channel 13. When calls are extended from 4-wire electronic switching equipment 15, various tones are transmitted over receiver pair 14. Responsive thereto, converter 12 transmits opened and closed loop signals over line 11 to central office 10.

Figure 2B:
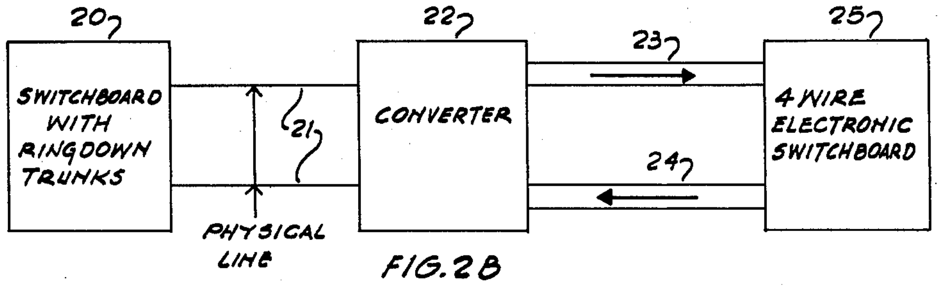

FIG. 2B shows a system utilizing ring-down signalling which may be extended from either a ring-down office or a magneto phone. All references hereinafter to "ring-down" operation also include magneto phone operation; although the latter is not specifically mentioned hereinafter. In greater detail, when conventional equipment 20 seizes electronic switching center 25, a first burst of 20 cycle ringing current is transmitted over line 21 to converter 22. Converter 22 responds by transmitting suitable tone signals over send pair 23 to electronic multi-frequency signalling switching equipment 25. When a second burst of ringing current is transmitted from central office equipment, 20 to converter 22, a release signal is transmitted over send pair 23. Conversely, when electronic switching equipment 25 seizes ring-down office 20, tone signals are transmitted over receive pair 24 to converter 22. Responsive thereto, converter 22 transmits a first burst of 20 cycle ringing current to central office 20 over conductors 21. When a release tone is transmitted from electronic switchboard 25 over receiver pair 24 to converter 22, a second burst of 20 cycle ringing current is transmitted over line 21 to ring-down switchboard 20 which releases.

Figure 2C:
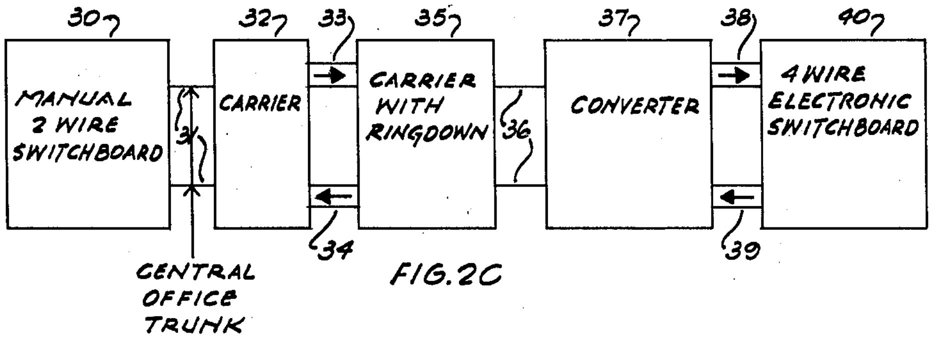

FIG. 2C shows the manner in which a carrier system may be included in either of the systems shown in FIGS. 2A or 2B. In general, conventional carrier equipment 32 and 35 is inserted between a switchboard 30 and converter 37. The carrier equipment extends conventional signals (ring-down, for example) over 2-wire line 36 to converter 37, and conversely converter 37 signals carrier 35 in any suitable manner. Quite obviously, means may also be provided for transmitting common battery or other signals over conductors 36, as required.

*Detailed Description*

Referring next to the equipment of FIGS. 3–5, there is shown a single channel for use in converters 12, 22 and 37. Each converter may include as many channels as may be required by traffic between various offices. The 2-wire side of the converter (items 11, 21 and 36 in FIG. 2) is illustrated in the upper left-hand portion of FIG. 3 as item 300. The 4-wire side of the converter (items 13, 14, 23, 24, 38 and 39 in FIG. 2) is shown near the right-hand edge of FIG. 5 as items 307 and 308. The operator's control unit 16 (FIG. 2) is also shown near the bottom of FIG. 3.

As pointed out above, the converter of FIGS. 3–5 may operate either in conjunction with ring-down or common battery equipment, the selection of signals being determined by the position of a manually controlled gang-switch 315–318. In the position shown in FIG. 3, each of the switch blades 315–318 interconnects terminals "*a*" and "*b*," thereby preparing the circuit for operation in conjunction with common battery equipment. For ring-down operation, switches 315–318 are operated to interconnect terminals "b" and "c."

*Common Battery Signalling*

Seizure signal (2-wire side) means is provided for seizing the converter of FIGS. 3–5 from common battery central office equipment responsive to the transmission of ordinary ringing current, detection being responsive to signal strength or amplitude. That is, to extended calls from a common battery office to an electronic switching office, a directory number is dialed and switching equipment in the common battery office operates in the manner that such equipment operates when any call is extended. A line or other voice channel extending to the converter is seized in the manner that any subscriber line is seized. A connector thereafter transmits ringing current over the channel or circuit extending from the tip side of line 300 through normally closed contact 301, hybrid coil 304, network 319, ring detector 320, network 319, hybrid coil 305, and normally closed contact 302 to the ring side of line 300. Coupling network 319 allows—see page in components description section—the low frequency ringing currents to pass. Ring detector 320 is adapted to respond to electrical signals having relatively high amplitude or signal strength such as commonly found in ringing currents but not to respond to signals having a relatively low amplitude or signal strength such as normally found in voice currents.

Responsive to the detection of ringing current, a signal is extended from the output of circuit 320 to the input terminal of signal end detector 440. At the end of the first burst of ringing current which is received over line 300, signal end detector 440 applies a pulse to the input terminal of 1–2 switch 441 which is now in its normal condition. Therefore, flip-flop 442 is triggered to an "on" condition.

Also responsive to the detection of ringing current in the 2-wire voice channel, an off-hook supervisory signal is returned to the common battery office. That is, when flip-flop 442 turns-on, an output signal is transmitted therefrom through "OR" gate 433 to five second timer 432. For the next five seconds, a signal is applied to an inhibit terminal of ring detector 320 so that it will not respond to a second burst of ringing current, if any is received over line 300—see the description of "Ring-Down Signalling" for more details about this feature Also responsive to the output of flip-flop 442, a signal is applied through "OR" gate 423 to turn-on flip-flop 422. The control terminal of 1–2 switch 424 is energized. Responsive to the output of flip-flop 422, amplifier 324 is energized to light busy lamp 344, and winding 311 is energized via switch 315 to close contacts 310 and 312. An off-hook simulating answer signal is returned to the equipment that is connected to conductors 300, the circuit extending from the tip side of line 300 through contacts 301, winding 304, switch 316, contacts 310, dial assembly 342, winding 305, contact 302 and the ring side of trunk 300. In the office attached to conductors 300, a ring current relay is tripped in any well known manner responsive to the closure of contacts 310 as described above.

Means is provided for transmitting a seizure signal to the electronic office responsive to the detection of ringing current in the voice channel extending to the 2-wire office. Returning to the point where flip-flop 442 was energized, a signal is transmitted through inhibit gate 443 and "OR" gate 523 to energize "S" tone gate 531. Tone gate 531 conducts signals of "S" frequency which are applied through output transformer 534 to the send pair of conductors 307. The "S" tone is a seizure signal to the 4-wire office.

Acknowledgement signal equipment (not shown) attached to conductors 307 and 308 responds to the seizure signals or "S" tone by making ready any suitable switching equipment. When such equipment is ready to extend a call, dial tone and/or "S" tone as an acknowledgement signal is returned from the 4-wire office over conductors 308 to constant output amplifier 511. Although "S" tone is applied to all detector circuits (510, 512 and 513) only the "S" tone detector 510 is energized—see the above identified Ligotky application for greater detail. The output of "S" tone detector 510 is fed through off-normal 1–2 switch 424 to the input terminal of 200 millisecond timer 514 and simultaneously (therewith to) "OR" gate 547. The output of "OR" gate 547 triggers 100 millisecond timer 548 which provides a signal that energizes UX tone gate 533, thereby transmitting a signal of UX frequency over line 307.

Means is provided for replying to the acknowledgement signal. That is, for a period of 100 milliseconds, as measured by timer 548, UX tone is transmitted over conductors 307. When timer 548 times-out and no longer energizes tone gate 533, silence "is applied" to conductors 307. After 100 milliseconds of silence 200 millisecond timer 544 times-out thereby triggering signal end detector 546. The output of signal end detector 546 is applied through "OR" gate 547 to energize 100 millisecond timer 548. For a second period of 100 milliseconds, a signal is applied to energize UX tone gate 533 which is turned-on thereby applying a UX tone to conductors 307. Hence, it is seen that the interaction between timers 544 and 548 results in a transmission of two 100 millisecond burst of UX tone separated by a 100 millisecond period of silence.

Also responsive to the output signals from timers 544 and 548, "OR" gate 549 is energized to inhibit gate 443. When gate 443 turns-off, the energizing signal which formally caused transmission of seizure or "S" tone is blocked and "S" tone is removed from conductors 307.

Switch through means is provided for telephonically interconnecting the 2-wire and the 4-wire offices. That is, any suitable equipment in the 4-wire switchboard responds to the receipt of UX tone by stopping the transmission of "S" tone over conductors 308. Responsive thereto, signal end detector 429 produces a pulse which triggers flip-flop 428 to an "on" condition. The output of flip-flop 428 is transmitted through inhibit gate 427 to line switch control circuit 426 which energizes coils 412 and 450 to close contacts 410, 411, 451 and 452, respectively. The telephonic circuit (shown as heavily inked conductors) is now switched through from the 2-wire equipment to the 4-wire equipment.

Also responsive to the output of flip-flop 428, which was turned-on as explained above, a circuit is completed to inhibit "S" tone detector 510, thereby guarding against inadvertent operation responsive to simulations of "S" frequency in the voice signal. Flip-flop 428 also energizes 200 millisecond timer 430 which turns-on without significant effect at this time. Still further, an energizing pulse is extended over a circuit including "OR" gate 434 to reset flip-flop 442 and to inhibit timer 541 and signal end detector 542, if such reset and inhibit functions has not been accomplished previously.

*Release*

When the converter of FIGS. 3–5 is operating in conjunction with common battery equipment (as described above, release is under the control of the 4-wire office connected to conductors 307 and 308. First, release may be responsive to a release signal of "YZ" frequencies. Second, release may be responsive to quiescence or silence on the line for a period of 3 minutes. The first to be described, below, is the release which occurs responsive to 3 minutes of silence on the line.

Means is provided for continuously sampling signals on said voice channel and for causing a release responsive to a continuous period of three minutes during which no signals occur. That is, an output terminal of constant output amplifier 511 is connected to busy detector circuit 421. As long as voice or other currents appear on line 308, a signal is applied from amplifier 511 to circuit 421 and nothing further happens. When there are no voice or other currents on line 308, busy detector 421 energizes 3 minute timer 420. If voice or other currents reappear on line 308 before 3 minute timer 420 times-out, the current extended from amplifier 511 is busy detector 421 cancels the operation of 3 minute timer 420. On the other hand, if voice or other current do not reappear on line 308, within 3 minutes, timer 420 conducts at its output terminal. Responsive to the output of 3 minute timer 420, an energizing current is applied through "OR" gate 434 ot reset flip-flop 442 if not already reset and to inhibit timer 541 and signal end detector 542. The output of 3 minute timer 420 is also fed through "OR" gate 520 to trigger 3 second timer 521.

For the next 3 second time period, signals from timer 521 are applied to inhibit gate 522; however, the release tone "YZ" is not sent until after 200 milliseconds, as explained below. A circuit may also be traced from the output terminal of 3 second timer 521 through "OR" gate 433 and 5 second timer 432 to an inhibit terminal of ring detector 320 thereby preventing a false operation if ringing current should occur on line 300 at this time. Another signal transmitted from the output of 3 second timer 521 through "OR" gate 425 resets flip-flops 422, 428 and 323.

Returning to the time when 3 minute timer 420 turned-on, a signal is transmitted through "OR" gate 330, 1 second timer 322, and "OR" gate 321 to the inhibit terminal of gate 427. Also, when flip-flop 428 is reset as explained above, energizing current is no longer applied to the input terminal of inhibit gate 427. In any event, when current is no longer transmitted from inhibit gate 427, line switch control circuit 426 deenergizes coils 412 and 450; therefore, contacts 410, 411, 451 and 452 open to break the talking circuit previously extended over the heavily inked conductors 307 and 308.

Means is provided for returning on-hook supervision to release equipment connected to conductors 300. When flip-flop 422 is reset, as described above, current is no longer applied through switch 315, and winding 311 to ground. When winding 311 is deenergized, contacts 310 open, thereby breaking the direct current path across conductors of line 300 which previously extended from contacts 301, through coil 304, switch 316, contacts 310, dial assembly 342, coil 305, and contacts 302. The opening of contacts 310 is an on hook signal which releases equipment connected to line 300.

It should be noted that the 4-wire side of the converter (conductors 307 and 308) may be subject to unbalanced conditions during release; therefore, signalling is delayed until such conditions have subsided. In greater detail, flip-flop 428 is on during a call and is turned-off during release, as explained above. As long as flip-flop 428 is in an "on" condition, 200 millisecond timer 430 is conducting a current which inhibits gate 522 thereby preventing the transmission of "YZ" release tone. The 200 millisecond delay is provided because a hybrid circuit (not shown) attached to the distant end of conductors 307 and 308 may become unbalanced momentarily during release so that if a tone is applied to conductors 307, it is fed back to conductors 308. After flip-flop 428 ceases to conduct, timer 430 measures 200 milliseconds and then it too ceases to conduct thereby removing the inhibiting signal from gate 522. The danger of an unbalanced hybrid condition has passed and the 3 second timer 521 still has a conductive period of three seconds less 200 milliseconds. During such period, an energizing current is applied through inhibit gate 522 to energize tone gate 530 thereby transmitting release tone "YZ." When timer 521 times out, the transmission of "YZ" tone terminates. Equipment connected to lines 307 and 308 releases responsive to the receipt of "YZ" tone.

Next to be described is release responsive to the receipt of a "YZ" tone signal which is transmitted over line 308 by equipment attached thereto. Since the release signal is a complex tone having "Y" and "Z" frequencies, the output of constant output amplifier 511 is fed through detectors 512 and 513 which respond by energizing both input terminals of "AND" gate 431. When "AND" gate 431 conducts, a signal is transmitted through "OR" gate 425 to reset flip-flops 422 and 428 thereby producing the effects described above. Also responsive to the energization of "AND" gate 431, "OR" gates 321 and 433 are energized to trigger 5 second timer 432 thereby inhibiting ring detector 320. The output of "OR" gate 321 is also applied to inhibit gate 427 thereby causing line switch control 426 to deenergize coils 412 and 450 with the results described above.

*Seizure Signal (4-Wire Side)*

The next circuit functions to be described are those which occur when the 4-wire equipment connected to conductors 307 and 308 extends a call via the converter of FIGS. 3–5 to 2-wire equipment attached to line 300. The 4-wire seizure signal is a burst of "S" tone which is transmitted over conductors 308. The 2-wire seizure signal results from an energization of winding 311 and the consequential closure of a line loop at contacts 310 which is in simulation of standard subscriber controlled off-hook supervision.

Means is provided for seizing the connector of FIGS. 3–5 responsive to the receipt of "S" tone over conductors 308. In greater detail, the output of amplifier 511 is fed through detector circuits 510, 512 and 513. Only the "S" tone detector 510 responds, thereby transmitting a signal through 1–2 switch 424 and the lower input terminal of "OR" gate 423 to turn-on flip-flop 422.

Responsive to the output of flip-flop 422, a signal is transmitted over the circuit including switch 315 and winding 311 to ground. When winding 311 is energized, contacts 310 close thereby completing a D.C. circuit for transmitting off-hook supervision as follows: contacts 301, winding 304, switch 316, contacts 310, dial assembly 342, winding 305 and contacts 302; the closure of the above traced D.C. circuit causes any suitable line finding equipment attached to conductors 300 to find the converter equipment shown in FIGS. 3–5. Also responsive to the output of flip-flop 422 busy detector 421 is triggered; however, it is assumed that there is no effect since voice or other currents appear on line 308 within 3 minutes.

Returning to the energization of 1–2 switch 424 as described above, a signal is transmitted to trigger 250 millisecond timer 541. Responsive thereto, a signal is extended through "OR" gate 523 to energize "S" tone gate 531 thereby transmitting a 250 millisecond burst of "S" tone through transformer 534 to conductors 307. Certain equipment which may be connected to conductors 307 is adapted to respond to the "S" tone while other equipment is adapted to respond to "VZ" tone. Therefore, when 250 millisecond timer 541 times-out, signal end detector 542 applies a signal to 250 millisecond timer 543. Thereafter, gate 532 is energized and a 250 millisecond burst of "VZ" tone is transmitted over conductors 307.

The circuit functions which follow depend upon whether the 4-wire equipment attached to conductors 307 and 308 is adapted to respond to the "S" or "VZ" signalling. In either event, the 4-wire equipment responds to one or the other signals by removing "S" tone from conductors 308. First, it is assumed that the 4-wire equipment responds to the "S" tone that is transmitted over conductors 307 by removing the "S" tone that is transmitted over conductor 308. When the "S" tone is removed from conductors 308, the output from signal end detector 429 energizes flip-flop 428. The energization of a circuit traced from the output of flip-flop 428 through "OR" gate 434 to the inhibit terminals of timer 541 and signal end detector 542 prevents the transmission of tone having "V" and "Z" frequencies. On the other hand, if it is assumed that the 4-wire equipment attached to conductors 307 and 308 responds to "VZ" tone, "S" tone is removed from conductors 308 responsive to the transmission of "VZ" tone over line 307. Again, when "S" tone is removed from line 308, detector 429 and flip-flop 428 cooperate to remove "VZ" tone, as described above. The description which follows is the same regardless of whether the 4-wire equipment responds to the "S" or the "VZ" tones.

Responsive to the output of flip-flop 428, a signal is applied through inhibit gate 427 and line switch control circuit 426 to energize windings 412 and 450 thereby closing contacts 410, 411, 451 and 452 to cause switch through of the heavily inked talking conductors. The output of flip-flop 428 is also fed to the inhibit terminal of "S" tone detector 510 to guard against inadvertent response to "S" frequencies in voice currents. Timer 430 is energized without effect at this time. Also responsive to the output of flip-flop 428, "OR" gate 434 is energized to reset flip-flop 442 and to inhibit timer 541 and detector 542.

Equipment connected to line 300 responds to closure of contact 310 (as described above) and the call may be completed thereafter in a conventional manner. The circuit is released in the manner described above, under the subheading "Release."

Under some conditions it may be necessary to summon an operator to facilitate a connection. For example, the 2-wire office may include certain switching equipment which requires specific dial signals. Therefore, line lamp 345 or a buzzer (not shown) is provided to summon the operator, as required. While there may be many times when an operator is required the subject circuit illustrates signalling responsive to seizure from the 4-wire office. That is, when "S" tone is received during the extension of a call from the 4-wire office, a signal is transmitted through 1–2 switch 424 normal to trigger 250 millisecond timer 541. The output of timer 541 is applied to turn-on flip-flop 323. The output of flip-flop 323 is extended through amplifier 325 to light line lamp 345 and sound a buzzer, if provided. Responsive thereto, the operator may use headset 343 to converse with the subscriber in the 4-wire office and take any required action. For example, dial assembly 342 may be used to control switching equipment in the 2-wire office.

*Ring-Down Signalling*

The next functions to be described are those which occur when 2-wire line 300 are connected to a ring-down office. To prepare for operating in conjunction with ring-down signalling, switches 315–318 are manually operated from the positions shown in FIG. 3 so that switch makes contact between its associated "*b*" and "*c*" terminals.

*2-Wire to 4-Wire*

Since the circuit functions during ring-down in a manner which is similar to that described above, no attempt will be made hereinafter to trace every circuit detail. In general, a burst of 20-cycle ringing current is received from a 2-wire office attached to conductors 300. Responsive thereto ringing detector 320 conducts to turn-on signal end detector 440 and flip-flop 442. The output of flip-flop 442 triggers time 432 and for a period of five seconds detector 320 is inhibited because a second burst of ringing current might otherwise cause release. A signal transmitted from flip-flop 442 through gates 443 and 523 causes transmission of "S" tone to seize the 4-wire office, following which the circuit functions as described above.

During common battery signalling, as explained above, a D.C. acknowledgement signal is returned over conductors 300 to the 2-wire office by the closure of contacts 310 in simulation of hookswitch operation. However, no similar acknowledgement signal is required during ring-down operation.

Release during ring-down operation may be either under control of the 2-wire office attached to conductors 300 or the 4-wire office attached to conductors 307 and 308. Referring first to release under control of the 4-wire office, let it be assumed that release is responsive to the receipt of "Y" and "Z" tones as distinguished from release under the control of 3 minute timer 420. Constant output amplifier 511 conducts, thereby energizing tone detectors 512 and 513. Both input terminals of "AND" gate 431 are marked simultaneously, thereby extending a signal through "OR" gate 425 for resetting flip-flops 422 and 428 and for resetting flip-flop 323 via "OR" gate 331. Also responsive to the output of "AND" gate 431, a signal is transmitted to "OR" gate 321, terminal "*b*," switch 318, terminal "*c*" and "OR" gate 350 to winding 351 and ground, thereby closing contacts 352 and 353 to transmit 20-cycle per second ringing current over conductors 300. The 20-cycle current is a signal which releases equipment in the 2-wire ring-down office. Again there is no need to open or close a D.C. loop as described above, in connection with a description of signalling to a common battery office. In parallel with the above traced circuit through winding 351 a circuit may be traced from switch 318 through switch 315 and winding 311 to ground, thereby closing contacts 312. A circuit may now be traced from negative battery through contacts 312, switch 317, terminal "*c*" and winding 303 to ground. Responsive to the energization of winding 303, contacts 301 and 302 open, thereby preventing the transmission of 20 cycle per second current from contacts 352 and 353 to hybrid circuits 304 and 305.

It is thought that all other circuit functions during release from the 4-wire office will be obvious from the foregoing description under the sub-title "Release."

Means is provided for remembering the receipt of a 20 cycle seizure signal from the 2-wire ring-down office because the next 20 cycle signal that is received must be interpreted as a release signal. That is 1–2 switch 441 normally triggers flip-flop 442 responsive to the receipt of a seizure signal. Thereafter "S" tone is sent to and received from the 4-wire office—all as explained above. Responsive to the end of the "S" tone signal, as received over conductors 308, detector 429 and flip-flop 428 are energized. A signal is transmitted to turn-on 200 millisecond timer 430 and thereby to mark the control terminal of 1–2 switch 441 for the duration of a call (release being under control of the 4-wire office) plus 200 milliseconds. If a second burst of 20 cycle ringing current from the 2-wire office is detected by circuit 320, at the end of the burst of ringing, signal end detector 440 applies a signal through off-normal 1–2 switch 441 and "OR" gate 520 to trigger 3 second timer 521. Thereafter, the circuit releases as described above. Hence, it is seen that 1–2 switch in conjunction with flip-flop 428 functions as a memory device during ring-down operation to cause a release if a burst of 20 cycle ringing current is received from the 2-wire office at any time after the receipt of "S" tone from the 4-wire office and before 200 milliseconds following release from the 4-wire office—the 200 millisecond period being provided to insure complete release before re-seizure. No similar response occurs during common battery operation since ring detector 320 is shunted because switch 316 is as shown in the drawing, the shunt extending through items 301, 304, 316, 310, 342, 305 and 302.

*4-Wire to 2-Wire*

Next to be described is seizure of a 2-wire ring-down office responsive to signals emanating from a 4-wire exchange connected to conductors 307 and 308.

The seizure signal ("S" tone) is transmitted over conductors 308 from the 4-wire office to circuit 510. Responsive thereto, 1–2 switch 424 conducts and transmits a signal to timer 541 which turns-on thereby extending an energizing signal to "OR" gate 523 and "S" tone gate 531. Also responsive to the output of 250 millisecond timer 541, "OR" gate 330 is energized to trigger timer 322. The output of timer 322 is applied through "OR"

circuit 321, switch 318, and "OR" gate 350 to energize winding 351 and in parallel therewith through switch 315 and winding 311. Responsive to energization of winding 311, contacts 312 close, thereby completing a circuit via switch 317 to energize coil 303 and open the heavily inked talking conductors at contacts 301 and 302. Responsive to energization of winding 351, contacts 352 and 353 close, thereby transmitting 20 cycle per second ringing current over conductors 300 to the ring-down office.

Timer 322 times-out in one second, thereby terminating the transmission of an energizing current through "OR" gates 321 and 350 to windings 351 and 311. When winding 351 deenergizes, contacts 352 and 353 open to terminate the transmission of 20 cycle per second ring current. When winding 311 deenergizes, contacts 312 open to release relay 303 and close contacts 301 and 302, thus recompleting the talking circuit. The transmission of ringing current which was just described is a seizure signal to the 2-wire ring-down office.

While the principles of the invention have been described above in connection with specific apparatus, it is to be clearly understood that this description is made only by way of example and not as a limitation to the scope of the invention.

We claim:

1. In a telephone system, a plurality of exchanges having dissimilar signalling systems, some of said exchanges including conventional common battery or ring-down equipment and other of said exchanges including multi-frequency electronic switching equipment, converter means for converting signals emanating from a signalling one of said exchanges to signals which are usable at a signalled one of said exchanges, means comprising a communication channel for interconnecting said conventional and said electronic equipment via said converter means, means for transmitting over said channel at least one of said signals between said conventional equipment and said converting means in the form of bursts of ringing signals of relatively high strength, means for transmitting over said channel at least some of said signals between said electronic equipment and said converting means in the form of tones, means for transmitting relatively low strength voice signals over said channel and means in said converting means for detecting said ringing signals responsive to the strength of signals received over said channel.

2. The telephone system of claim 1 and means coupled to said channel for utilizing said voice signals, means for limiting said ringing signals responsive to the receipt of said signals of high strength thereby protecting said telephone system against said high signal strength, means coupled to said channel for utilizing said ringing signals, and means for limiting the strength of all signals transmitted over said channel thereby protecting said last named means against excessive signal strength.

3. The telephone system of claim 1 and means responsive to said detection of said ringing signals for transmitting a seizure tone signal to said electronic equipment.

4. The telephone system of claim 3 and means responsive to said detection of said ringing signal for returning off-hook supervision to said conventional equipment.

5. The telephone system of claim 3 and means for returning an acknowledgement tone signal from said electronic to said converter responsive to the receipt of said seizure signal, and means responsive to receipt of said acknowledgement signal for telephonically interconnecting said conventional and said electronic equipment.

6. The telephone system of claim 1 and a voice channel means responsive to at least some of said signals for telephonically interconnecting said exchanges via said voice channel, means for continuously sampling signals on said voice channel, means for detecting an absence of signal on said voice channel after a predetermined period of time during which no signal occurs on said channel, and means responsive to said last named means for releasing said telephonic connection.

7. In a telephone system a plurality of exchanges having dissimilar signalling systems, some of said exchanges including conventional equipment and others of said exchanges including electronic switching equipment, means coupled between said conventional and said electronic equipment for converting signals emanating from a signalling one of said exchanges to signals which are usable at a signalled one of said exchanges, means comprising a voice channel for telephonically interconnecting said exchanges via said converting means, amplifier means having an input and at least two outputs, means for coupling said input to said voice channel, means responsive to signals on said voice channel for energizing said amplifier, a timer, means responsive to signals emanating from one of said outputs for resetting said timer whereby said timer times-out responsive to an absence of signals on said voice channel for an uninterrupted period of time, means for detecting predetermined frequencies emanating from the other of said outputs, and means responsive to either of said last two named means for releasing said telephonic connection.

8. The telephone system of claim 7 wherein said amplifier is connected to be energized responsive only to signals from one of said exchanges, and said release means comprises means for transmitting a burst of ringing current to another of said exchanges.

9. A signal converter comprising means for interconnecting dissimilar circuits at least one of which is a 4-wire circuit, said 4-wire circuit being subject to unbalanced conditions, means in said 4-wire circuit for transmitting signals to said converter, means controlled over said 4-wire circuit for causing said converter to return signals to said 4-wire circuit, and means in said converter for delaying said returned signals until said unbalanced conditions have subsided.

10. The converter of claim 9 and means for detecting signals in said 4-wire circuit, means responsive to said last named means for measuring a predetermined period of time during which no signals occur in said 4-wire circuit, and means responsive to expiration of said predetermined period of time without a signal occurring in said 4-wire system for initiating a release and for triggering said delay means, whereby said returned signals are sent over said 4-wire circuit after said delay period.

11. In a converter for interconnecting ring-down and dissimilar telephone systems, means responsive to the receipt of ringing current from said ring-down office for causing said converter to transmit seizure signals to said dissimilar office, means also responsive to the receipt of said ringing current for measuring a predetermined period of time, means effective during said period of time for preventing further response to the receipt of ringing current from said ring-down office, and means thereafter effective for causing a release function responsive to the receipt of additional ringing current from said ring-down office.

12. In a converter for interconnecting dissimilar signalling systems, the combination comprising; means for extending a particular signal from a first of said systems to said converter, means responsive to the receipt of said particular signal for transmitting a corresponding signal from said converter to a second of said systems, means also responsive to said receipt of said particular signal for remembering the occurrence of said particular signal, and means jointly responsive to said last named means and a reoccurrence of said particular signal for transmitting a different signal from said converter to said second system.

13. The converter of claim 12 wherein said particular signal comprises ringing current, said corresponding signal comprises seizure signal and said different signal comprises release signal.

14. In a telephone system a plurality of exchanges having dissimilar signalling systems, some of said exchanges including conventional ring-down or common battery signalling equipment and other of said exchanges including multifrequency tone signalling electronic switching equipment, means comprising a communication channel for interconnecting said conventional and said electronic equipment, means for converting signals emanating from a signalling one of said exchanges into signals which are usable at a signalled one of said exchanges, said converting means comprising means for transmitting and responding to signals in the form of bursts of ringing current, means for transmitting and responding to at least some of said tone signals, means for transmitting said ringing current signals over said channel responsive to receipt of said tone signals, and means for transmitting said tone signals over said channel responsive to the receipt of said ringing signals.

15. In a telephone system converter means including a source of ringing current and sources of supervisory tone frequencies, predetermined ones of said frequencies controlling release, certain of said frequencies controlling ringing, certain other of said frequencies providing seize and acknowledge signals, means comprising a voice channel for telephonically interconnecting dissimilar exchanges via said converting means, amplifier means having an input and at least two outputs, means for coupling said input to said voice channel, means responsive to signals on said voice channel for energizing said amplifier, a timer, means responsive to signals emanating from one of said outputs for resetting said timer whereby said timer times-out responsive to an absence of signal on said voice channel for an uninterrupted period of time, means connected to the other of said outputs for detecting predetermined ones of said frequencies, means responsive to either of said two last named means for releasing said telephonic connection, means responsive to the receipt of certain of said frequencies for connecting said source ringing current to said channel, and means selectively responsive to the receipt of certain other of said frequencies for connecting certain of said tone sources to said channel.

16. The telephone system of claim 15 and means responsive to the receipt of ringing current over said voice channel for selectively connecting certain of said tone sources to said channel.

17. In a converter for interconnecting common battery and dissimilar telephone systems, means responsive to the receipt of ringing current from said common battery system for measuring a predetermined period of time, means effective during said period of time for preventing further response to the receipt of ringing current from said common battery system, means also responsive to the receipt of said ringing current from said common battery system for causing said converter to transmit tone signals to said dissimilar system, and means thereafter effective in said converter for disengaging said common battery and said dissimilar telephone systems responsive to the receipt of additional release tone signals from said dissimilar system.

18. The converter of claim 17 and means responsive to said receipt of said ringing current for returning closed loop off-hook supervision to said common battery system.

19. The converter of claim 17 and means for returning an acknowledgement signal from said dissimilar system to said converter responsive to the receipt of seize tone signal, and means responsive to receipt of said acknowledgement signal for telephonically interconnecting said common battery and said dissimilar systems.

20. A signal converter having a 2-wire side and a 4-wire side, means connected to detect ringing signals incoming to said 2-wire side, a two condition electronic switch, means including said switch and effective when said switch is in one of said two conditions for coupling said detector to trigger the transmission of a seizure tone signal from said 4-wire side responsive to the receipt of said ringing signals at said 2-wire side, means responsive to said seizure tone signal for operating said switch to the other of said conditions, and means thereafter responsive to the receipt of said ringing signals at said 2-wire side for extending a release tone signal from said 4-wire side.

References Cited in the file of this patent

UNITED STATES PATENTS

| | | |
|---|---|---|
| 2,516,814 | Voss | July 25, 1950 |
| 2,579,530 | Wright | Dec. 25, 1951 |
| 2,848,546 | Pharis | Aug. 19, 1958 |
| 2,854,514 | Ensink | Sept. 30, 1958 |
| 2,874,226 | Pharis | Feb. 17, 1959 |
| 2,915,590 | Bergman | Dec. 1, 1959 |

FOREIGN PATENTS

| | | |
|---|---|---|
| 339,784 | Great Britain | Dec. 18, 1930 |
| 162,405 | Australia | Apr. 12, 1955 |
| 795,699 | Great Britain | May 28, 1958 |